United States Patent [19]

Nakayama et al.

[11] Patent Number: 5,568,597
[45] Date of Patent: Oct. 22, 1996

[54] ADAPTING IMAGE DATA RESOLUTION TO MATCH RESOLUTION OF AN OUTPUT DEVICE

[75] Inventors: Tadayoshi Nakayama, Tokyo; Yoshitake Nagashima, Chigasaki; Takashi Saito, Yokohama, all of Japan

[73] Assignee: Canon Kabushiki Kaisha, Tokyo, Japan

[21] Appl. No.: 246,506

[22] Filed: May 20, 1994

[30] Foreign Application Priority Data

May 24, 1993 [JP] Japan ................................ 5-121204

[51] Int. Cl.$^6$ ........................................... G06T 15/50
[52] U.S. Cl. ........................................ 395/132; 395/128
[58] Field of Search ............................. 358/428; 395/128, 395/129, 132

[56] References Cited

U.S. PATENT DOCUMENTS

| | | | |
|---|---|---|---|
| 4,723,163 | 2/1988 | Skinner | 358/140 |
| 4,985,764 | 1/1991 | Sato | 358/105 |
| 5,031,042 | 7/1991 | Rabii | 358/167 |
| 5,093,721 | 3/1992 | Rabii | 358/135 |
| 5,282,256 | 1/1994 | Ohsawa et al. | 382/56 |
| 5,289,293 | 2/1994 | Kato et al. | 358/457 |
| 5,381,522 | 1/1995 | Seto et al. | 395/143 |
| 5,430,811 | 7/1995 | Fukushima et al. | 382/254 |

*Primary Examiner*—Heather R. Herndon
*Assistant Examiner*—Rudolph Buchel
*Attorney, Agent, or Firm*—Fitzpatrick, Cella, Harper & Scinto

[57] ABSTRACT

Binary data are obtained on data of reference pixels included in the upper and below lines of an interpolated pixel through binarizing circuits by comparing with the threshold value determined based on the reference pixel data. Binary interpolation data of the interpolated pixel are obtained from the plurality of binary data. Maximum threshold data is determined as multivalued interpolation data of the interpolated pixel, when the binary interpolation data is "1".

15 Claims, 8 Drawing Sheets

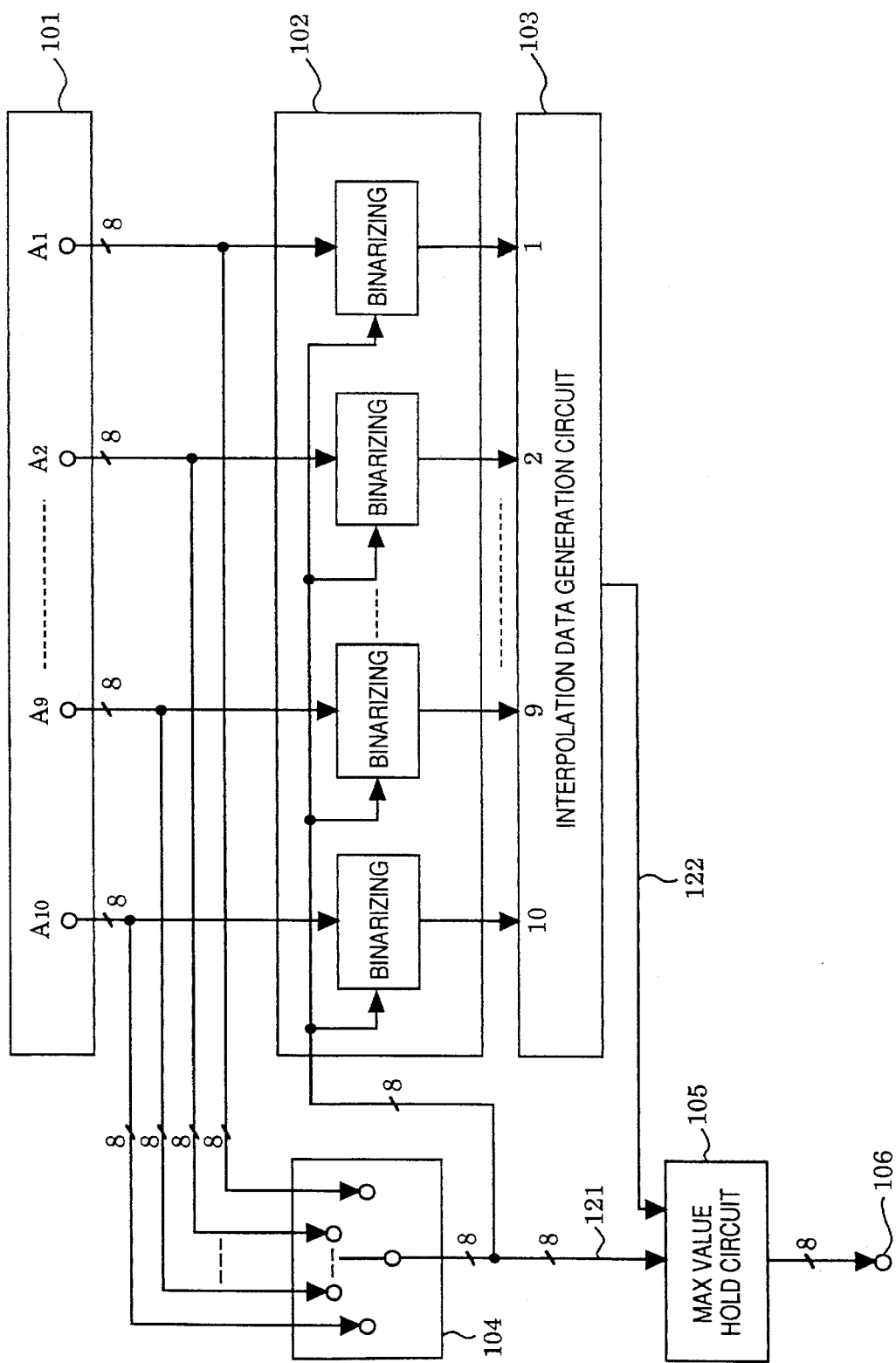

FIG. 2A

REFERENCE PIXEL
AND ⇒
INTERPOLATION PIXEL

| 70 | 70 | 70 | 80 | 170 |
|----|----|----|----|-----|
|    |    | X  |    |     |
| 70 | 80 | 170| 180| 180 |

FIG. 2B

| 70 | 70 | 80 | 170| 180 |
|----|----|----|----|-----|
|    |    | X  |    |     |
| 80 | 170| 180| 180| 180 |

FIG. 3A

BINARIZE ⇒
AT 70

| 1 | 1 | 1 | 1 | 1 |
|---|---|---|---|---|
|   |   | 1 |   |   |
| 1 | 1 | 1 | 1 | 1 |

FIG. 3B

| 1 | 1 | 1 | 1 | 1 |
|---|---|---|---|---|
|   |   | 1 |   |   |
| 1 | 1 | 1 | 1 | 1 |

FIG. 4A

BINARIZE AT 80 →

| 0 | 0 | 0 | 1 | 1 |
|---|---|---|---|---|
|   |   | 1 |   |   |
| 0 | 1 | 1 | 1 | 1 |

FIG. 4B

| 0 | 0 | 1 | 1 | 1 |
|---|---|---|---|---|
|   |   | 1 |   |   |
| 1 | 1 | 1 | 1 | 1 |

FIG. 5A

BINARIZE AT 170 →

| 0 | 0 | 0 | 0 | 1 |
|---|---|---|---|---|
|   |   | 0 |   |   |
| 0 | 0 | 1 | 1 | 1 |

FIG. 5B

| 0 | 0 | 0 | 1 | 1 |
|---|---|---|---|---|
|   |   | 1 |   |   |
| 0 | 1 | 1 | 1 | 1 |

FIG. 6A

BINARIZE AT 180 →

| 0 | 0 | 0 | 0 | 0 |
|---|---|---|---|---|
|   |   | 0 |   |   |
| 0 | 0 | 0 | 1 | 1 |

FIG. 6B

| 0 | 0 | 0 | 0 | 1 |
|---|---|---|---|---|
|   |   | 0 |   |   |
| 0 | 0 | 1 | 1 | 1 |

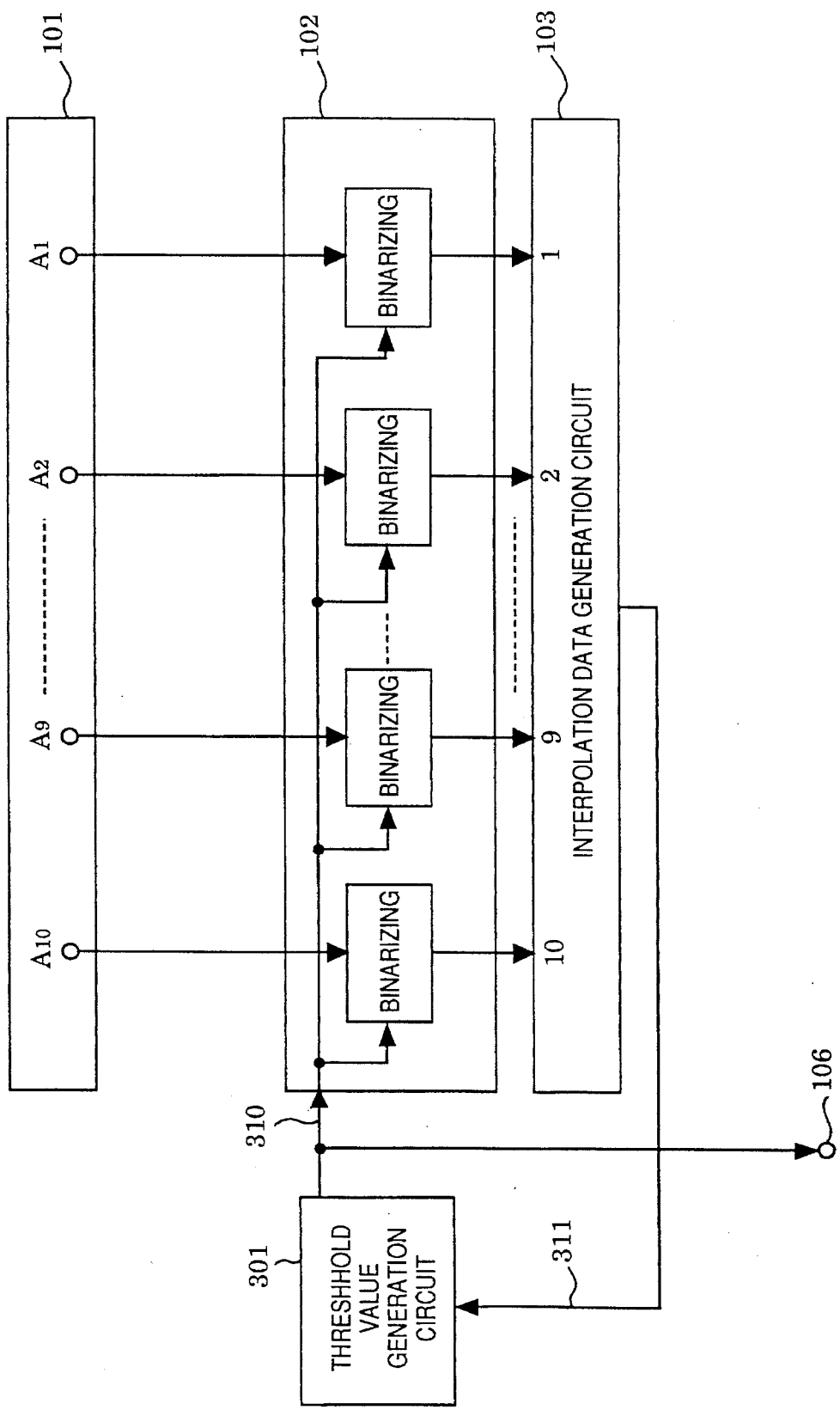

FIG. 9A

| 0 | 0 | 0 | 0 | 1 | 1 |
|---|---|---|---|---|---|
| $X_1$ | $X_2$ | $X_3$ | $X_4$ | $X_5$ | $X_6$ |
| 0 | 0 | 1 | 1 | 1 | 1 |

FIG. 9B

| 0 | 0 | 0 | 0 | 1 | 1 |
|---|---|---|---|---|---|
| 0 | 0 | 0 | 1 | 1 | 1 |
| 0 | 0 | 1 | 1 | 1 | 1 |

FIG. 10A

| 0 | 1 | 0 |
|---|---|---|
|   | X |   |
| 0 | 0 | 0 |

FIG. 10B

| 0 | $\frac{1}{2}$ | 0 |
|---|---|---|
|   | X |   |
| 0 | $\frac{1}{2}$ | 0 |

FIG. 10C

| $\frac{1}{8}$ | $\frac{1}{4}$ | $\frac{1}{8}$ |
|---|---|---|
|   | X |   |
| $\frac{1}{8}$ | $\frac{1}{4}$ | $\frac{1}{8}$ |

FIG. 11

| 70 | 70 | 70 | 80 | 170 | 180 |
|----|----|----|----|-----|-----|
|    |    | $X_1$ | $X_2$ |  |  |
| 70 | 80 | 170 | 180 | 180 | 180 |

FIG. 12

|     | $X_1$ | $X_2$ |
|-----|-------|-------|
| (A) | 70    | 80    |
| (B) | 120   | 130   |
| (C) | 111   | 139   |

F I G. 13
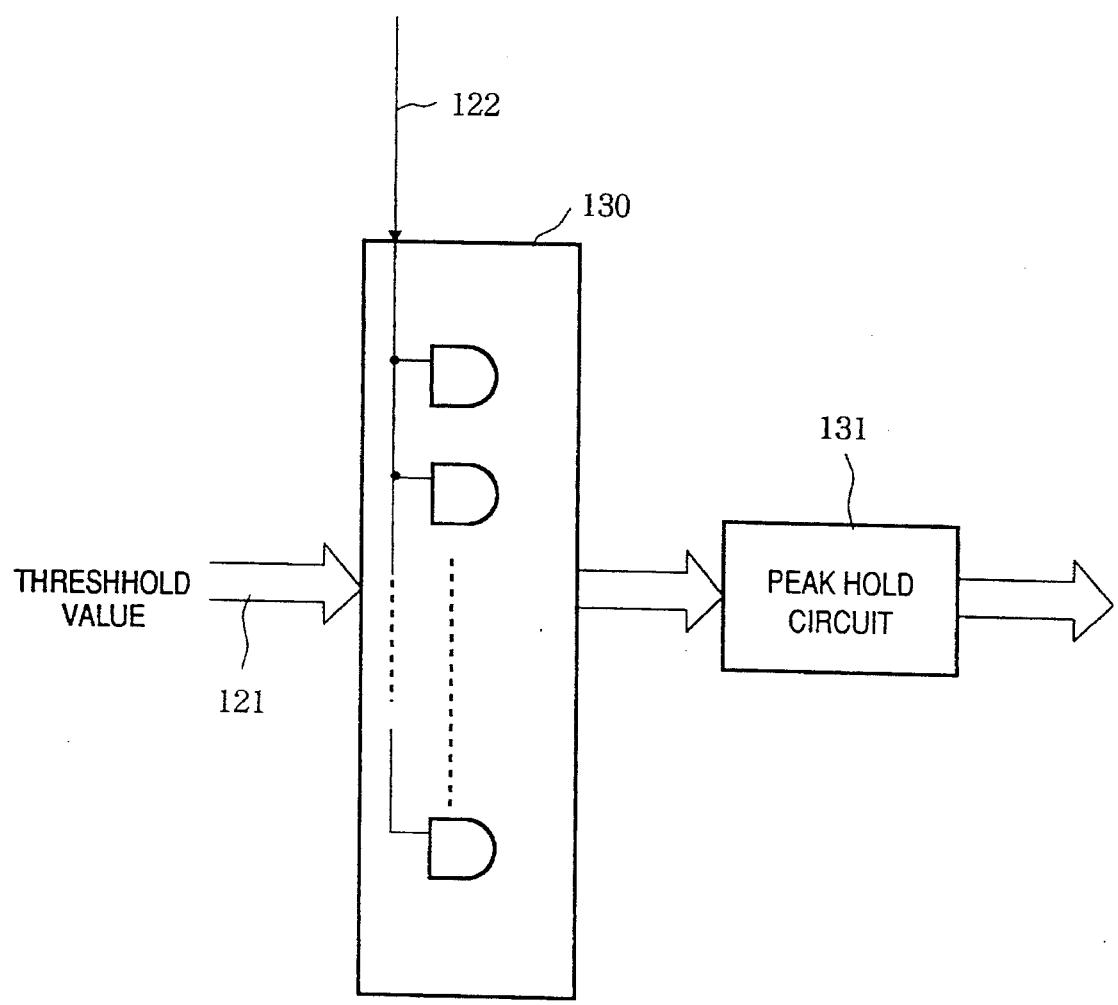

ADAPTING IMAGE DATA RESOLUTION TO MATCH RESOLUTION OF AN OUTPUT DEVICE

BACKGROUND OF THE INVENTION

The present invention relates to an image processing method and apparatus and, more particularly, to an image processing method and apparatus which obtain multivalued interpolation data for interpolating multivalued image data.

Recent development in increasing resolution of an image output apparatus such as a printer has made it possible to print or display a high-quality image. To efficiently utilize the function of such image output apparatus having a high resolution, it is necessary to form image data corresponding to the resolution of the output apparatus. A page description language such as PostScript is well known as descriptive method expressing graphic image data having a high resolution. Such description language describes text or graphic information on one page in a form which does not depend on the resolution of the image output apparatus. When output to the image output apparatus, bit map data of a resolution corresponding to the resolution of the image output apparatus to be used is generated based on the page description language.

On the other hand, when image data is in the form of bit map data originally (e.g., sampling image data read by a scanner), resolution conversion is complicated. For example, when the image data of a resolution of 200 dpi (dot/inch) is output to of printer having resolution of 400 dpi to obtain the image in the same size as the original image, the image data is subjected to an interpolation processing to convert the image data into new data whose pixel number in width and length is twice as large as in the original image data. This interpolation processing is dependent on whether the image data is binary or multivalued.

Hereinafter, the conventional interpolation processing to binary image data and multivalued image data are described.

FIGS. 9A and 9B are diagrams to explain an example of binary data interpolation.

In FIG. 9A, $X_1, X_2, \ldots X_6$ are pixel data to be obtained by the interpolation processing. The binary data on the upper and lower lines are pixel data existing before the interpolation processing. In the example, since the pixel data above and below the pixels $X_1$ and $X_2$, and $X_5$ and $X_6$ are respectively the same, the pixel data to be interpolated can be easily determined. That is, $X_1=X_2=0$, and $X_5=X_6=1$. On the other hand, since the pixel data on the pixels above $X_3$ and $X_4$ differ from the pixel data below the pixels $X_3$ and $X_4$ the corresponding, interpolation values cannot be determined simply by the pixel data. With the pixel datum to be interpolated (hereinafter, referred to as a "pixel of interest") as center, the five pixels respectively included in the next adjacent upper line and lower line are referred to as "reference pixels". For example, in the case of the pixel of interest $X_3$, the reference pixels of the upper line are "0, 0, 0, 0, 1, 1", and those of the lower line are "0, 0, 1, 1, 1, 1". As shown in FIG. 9A, since the pixel data change from "0" to "1" between the fourth and fifth pixels from the upper left, and the pixel data from "0" to "1" between the second and third pixels from the lower left, the interpolation value of the pixel of interest $X_3$ is determined as "0".

In the case of the pixel of interest $X_4$, since each of the changing points 0→1 in the reference pixels of the upper and lower lines is one pixel shifted from the changing point of the pixel of interest $X_3$, the interpolation value $X_4$ is determined as "1". Accordingly, the pixel data after the interpolation processing is as FIG. 9B showing that the edge in the slant direction is smoothed to correspond to the resolution.

The interpolation processing in the case of multivalued image data is described below. FIGS. 10A–10C are diagrams to explain the method of obtaining the pixel of interest X to be interpolated. FIG. 10A shows the case where a pixel value of the proceeding line which is located just above the pixel of interest X is used as an interpolation value. FIG. 10B shows the case where two pixel values located above and under the pixel of interest X are averaged as an interpolation value. FIG. 10C shows the case where six pixels of the upper and lower lines are subject to a weighted averaging to obtain an interpolation value.

FIGS. 11 and 12 are diagrams for explaining the conventional interpolation of multivalued image data. FIG. 12 particularly shows the case where interpolated pixel data $X_1$, $X_2$ of FIG. 11 are obtained in accordance with the interpolation processing of FIGS. 10A–10C. When the interpolation processing of FIG. 10A is applied, the (interpolation) pixel data $X_1$ and $X_2$ are determined by the data above the pixel data $X_1$ and $X_2$ of the proceeding (upper) line, that is, $X_1=70$, $X_2=80$. When the interpolation processing of FIG. 10B is applied, $X_1=(70+170)/2=120$ and $X_2=(80+180)/2=130$. Furthermore, when the interpolation processing of FIG. 10C is applied, $X_1=(70+80+80+180)/8+(70+170)/4=51+60=111$, and $X_2=(70+170+170+180)/8+(80+180)/4=74+65=139$.

As expected from the content of the interpolation processing in the case of the above-described binary image data, a large difference between the interpolation values $X_1$ and $X_2$ of the multivalued data may exist; however, such difference does not exist when the weighting is varied.

Accordingly, in the conventional interpolation processing of the multivalued image data, if an image edge exists in the reference pixels, since it will not be reflected in the interpolated pixels, the multivalued data obtained by the interpolation become dull and faded. Furthermore, if the method used for the conventional binary image data interpolation processing is applied to the multivalued image data interpolation processing, the hardware becomes large, and problems may arise in increase of the apparatus size and cost.

SUMMARY OF THE INVENTION

In the light of the above conventional technique, it is an object of the present invention to provide an image processing method and apparatus capable of generating interpolated pixel data reflecting the edge existing in multivalued image data.

It is another object of the present invention to provide an image processing method and apparatus capable of interpolating a multivalued image using a small hardware.

It is still another object of the present invention to provide an image processing method and apparatus capable of increasing the quality of multivalued image on which the interpolation is performed.

Furthermore, it is still another object of the present invention to provide an image processing method and apparatus capable of interpolating the multivalued image data at high speed.

Other features and advantages of the present invention will be apparent from the following description taken in conjunction with the accompanying drawings, in which like

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 1 is a block diagram illustrating the construction of the multivalued interpolation circuit of the first embodiment of the invention;

FIGS. 2A and 2B are diagrams respectively showing the relationship between the reference pixel data and an interpolated pixel;

FIGS. 3A and 3B are diagrams respectively showing the relationship between the binary data of the reference pixels and the interpolated pixel data when the threshold data is "70";

FIGS. 4A and 4B are diagrams respectively showing the relationship between the binary data of the reference pixels and the interpolated pixel data when the threshold data is "80";

FIGS. 5A and 5B are diagrams respectively showing the relationship between the binary data of the reference pixels and the interpolated pixel data when the threshold data is "170";

FIGS. 6A and 6B are diagrams respectively showing the relationship between the binary data of the reference pixels and the interpolated pixel data when the threshold data is "180";

FIG. 7 is a block diagram illustrating the construction of the multivalued interpolation circuit of the second embodiment of the invention;

FIGS. 9A and 9B are diagrams illustrating an example of the conventional interpolation processing of binary image data;

FIGS. 10A–10C are diagrams illustrating an example of the conventional interpolation processing of multivalued image data;

FIG. 11 is a diagram illustrating the relationship between the reference pixels and the interpolated pixels;

FIG. 12 is a diagram illustrating an example where the values of the interpolated pixels of FIG. 11 is obtained with reference to the interpolation coefficient of FIG. 10; and FIG. 13 is a diagram illustrating an example of the maximum hold circuit.

DESCRIPTION OF THE PREFERRED EMBODIMENTS

Figure 8:
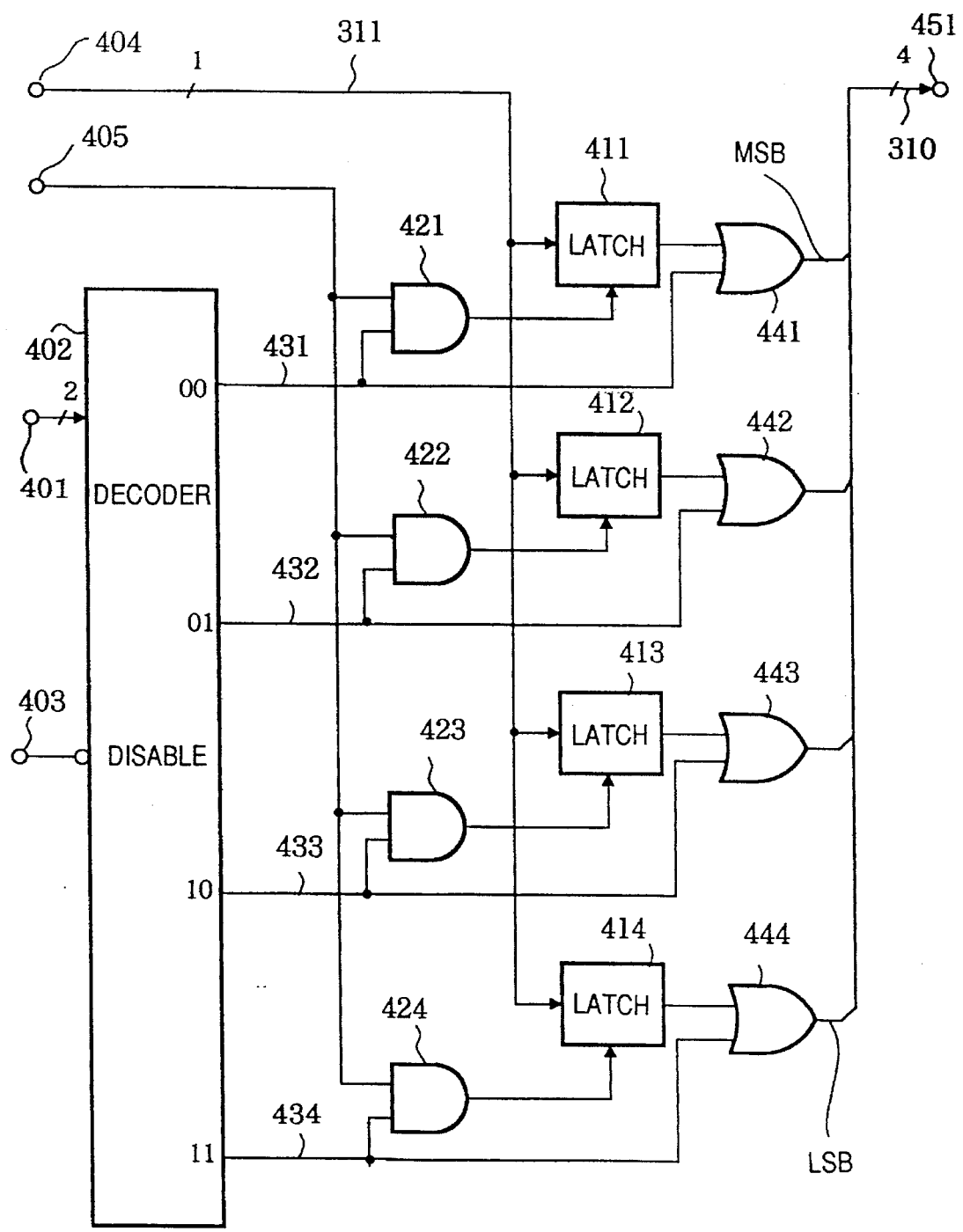
FIG. 8 is a circuit diagram illustrating an example of the threshold generation circuit in the second embodiment.

The preferred embodiments of the present invention will now be described in detail in accordance with the accompanying drawings.

[First Embodiment]

FIG. 1 shows an example of the interpolation circuit of the first embodiment.

In FIG. 1, numeral 101 is an input terminal for inputting a plurality of multivalued reference pixel data (each having 8 bits in this embodiment). Numeral 102 is a binarizing circuit for binarizing each of the plurality of multivalued reference pixel data using the same threshold. Numeral 103 is an interpolation data generation circuit for generating binary interpolation data 122. The circuit 103 can comprise a logical circuit or a table memory. In the former logical circuit, characteristic patterns are detected in the reference pixel-data, and an interpolation value is determined based on the detection result. On the other hand, in the latter case, which uses a table memory, interpolation values corresponding to all the combination patterns of the reference pixel data are set and stored in advance as a table. Either one of the above circuits can be used for the interpolation data generation circuit 103. Numeral 104 is a selector for selecting pixel data to be output to the binarizing circuit 102 as threshold value 121 from the plurality of multivalued data reference pixels. Numeral 105 is a maximum value hold circuit for generating a multivalued interpolation value based on the threshold value 121 sent to the binarizing circuit 102 and the interpolation data 122.

The operation of the circuit in FIG. 1 is described with reference to FIGS. 2–6 and FIG. 11.

First, the case where the value of the pixel $X_1$ (interpolation value) is obtained by using the reference pixels of the upper and lower lines.

The reference pixel data includes ten pixels as shown in FIG. 2A, and X becomes an interpolated pixel. The ten pixel data are respectively input into the terminals $A_1$–$A_{10}$ of the input terminal 101 of FIG. 1. The pixel (70) at the upper left is input from the terminal $A_1$, and the pixel (70) next to the first pixel is input from the terminal $A_2$. Similarly, the data are sequentially input from terminal $A_3$, $A_4$, . . . , and the pixel (180) at the lower right is input from the terminal $A_{10}$. Assume that each pixel data is composed of 8 bits.

Each pixel data input into the input terminal 101 is respectively transmitted to the binarizing circuits 102 and the selector 104. The selector 104 selects one of the input pixel data, and outputs the pixel data to the binarizing circuit 102 and the maximum hold circuit 105 as the threshold value 121 of the binarizing circuit 102.

The binarizing circuit 102 binarizes the ten pixel data in accordance with the threshold value 121 transmitted from the selector 104, and outputs the result to the interpolation data generation circuit 103. The order for the selector 104 to select input pixel data (reference pixel data) is arbitrary, however, in the embodiment, the order is as $A_1, A_2, \ldots, A_{10}$. In the example of FIG. 2A, the number of the reference pixels is ten, however, since the number of the pixel data types is four such as 70, 80, 170 and 180, the binarizing result and the binarizing interpolation data to four thresholds can be obtained. The binarized result and the binarized interpolation data to the four types of thresholds are shown in FIGS. 3A, 4A, 5A and 6A.

The binarizing circuit 102 outputs "1" if the pixel data input from the input terminal 101 is equal to or larger than the threshold value 121 from the selector 104, while "0" is output otherwise. The binarized interpolation data generation method performed in the interpolation data generation circuit 103 is similar to the conventional interpolation data generation processing of the binarized image data. If the values of the reference pixels above and below the pixel of interest are the same, that value is automatically determined as the interpolation datum, such as pixels $X_1$, $X_2$, $X_5$, $X_6$ in FIGS. 9A and 9B. If the values of the reference pixels are different, such as pixels $X_3$ and $X_4$ in FIGS. 9A and 9B, a changing point where a value changes is detected in the upper and lower lines respectively, and the interpolation datum is determined so as to be at the center of the interpolation line. (Other rules are not determined.)

As apparent from FIGS. 3A, 4A, 5A and 6A, when the threshold value 121 is "70" or "80", the binary interpolation data 122 is "1". While the threshold value 121 is "170" or "180", the interpolation data 122 is "0".

The threshold value 121 and the binary interpolation data 122 to the threshold value 121 are transmitted to the maximum value hold circuit 105. In the maximum value hold circuit 105, prior to the above-described sequential processing for each interpolated pixel, a hold value is cleared by a clear signal which is not shown. Subsequently, the thresholds value 121 to the ten reference pixels for a single interpolated pixel (X) and the binary interpolation data 122 to the threshold value 121 are input. The largest value in the threshold value 121 is held, when the interpolation datum 122 becomes "1".

An example of the structure of the maximum value hold circuit 105 is shown in FIG. 13. In FIG. 13, the maximum value hold circuit 105 includes a gate circuit 130 (having eight two-input AND circuits) where the input 8-bit threshold value 121 is passed when the binary interpolation data 122 is high "1", and a peak hold circuit 131 for holding the maximum value in the output values through the gate circuit 130. A general purpose circuit can be used as a peak hold circuit 131.

In the case of FIGS. 2A, 3A, 4A, 5A and 6A, the maximum threshold value 121 where the binary interpolation data is "1" is "80" (in the case of FIG. 4A), this value is held as the multivalued interpolation data in the peak hold circuit 131, and output to the output terminal 106.

Similarly, the interpolation data of the interpolated pixel $X_2$ in FIG. 11 is considered. The reference pixel data in this case are ten pixel data as shown in FIG. 2B, and "X" is an interpolated pixel. Similar to the above-described case, the pixel levels (types) are four levels (types) such as "70", "80", "170" and "180". If binary values and binary interpolation data for the four thresholds are determined, multivalued interpolation data are also determined. These values are shown in FIGS. 3B, 4B, 5B and 6B.

In this case, since the maximum threshold value where the binary interpolation data becomes "1" is "170" (in the case of FIG. 5B), "170" is held in the peak hold circuit 131 in the maximum value hold circuit 105 and output to the terminal 106 as the multivalued interpolation datum.

As described above, when the circuit structure of this embodiment is adapted, values of the interpolated pixels $X_1$ and $X_2$ in FIG. 11 are determined as "80" and "170" respectively, and the edge in the reference pixels exists also in the interpolated pixel data.

[Second Embodiment]

In FIG. 7, numerals 101, 102, 103 and 106 are identical to the units having the same reference numerals in FIG. 1. Numeral 301 is a threshold generation circuit to generate a threshold.

The threshold value 310 for binarizing operation, output from the threshold generation circuit 301, is not the input reference pixel data as shown in the first embodiment. When the input pixel data is n bits, "$2^{n-1}$" is used as an initial value of the threshold value 310.

Based on the threshold value 310, each of the reference pixel data input from the input terminal 101 is binarized by the binarizing circuit 102, and the binary interpolation datum 311 is obtained by the interpolation data generation circuit 103. The threshold value 310 used for binarizing the reference pixel data depends on the previously obtained binary interpolation datum 311. When the interpolation datum 311 becomes "1", the threshold for the binarizing operation is "$2^{n-1}+2^{n-2}$", while the interpolation datum 311 is "0", the threshold value is "$2^{n-2}$".

The transition of the n-bit threshold value 310 is expressed as following:

(1) Clear the n-bit threshold value 310 to "0" for initialization.

(2) Repeat the processing (3)–(6) for i=0, 1, . . . , n−1.

(3) Set the i-th bit of the threshold value 310 to "1".

(4) Binarize the input reference pixel data based on the threshold value 310.

(5) Obtain the binary interpolation datum 311 from the binary result.

(6) Determine the binary interpolation data 311 as a final value of the i-th bit of the threshold value 310.

When the above processing has ended, a maximum threshold value 310 where the binary interpolation datum 311 becomes "1" is obtained. This threshold value is determined as the multivalued interpolation datum, and output to the output terminal 106.

If the number of reference pixel data is larger than the number "n" of bits of the threshold value, the result (the multivalued interpolation data) can be obtained faster with the processing of the second embodiment than the first embodiment.

The detail of the threshold generation circuit 301 which performs the processing (1)–(6) is shown in FIG. 8. In FIG. 8, the case where n=4 is described.

In FIG. 8, numeral 401 is a terminal for inputting a 2-bit signal which designates a bit position. Numeral 402 is a decoder for decoding the 2-bit signal to four signals 431–434. Each of the signals 431, 432, 433 and 434 becomes high "1", when the 2-bit signal is "00", "01", "10" and "11" respectively. Numeral 403 is a disable signal. When the disable signal 403 is of low level, the four signals output from the decoder 402 are all low "0". The binary interpolation datum 311 is input from the terminal 404. The latch circuits 411–414 latch the binary interpolation datum 311 in accordance with the latch signals output from each AND circuit. A terminal 405 is an input source for inputting latch signal. AND circuits 421–424 pass the latch signals to the latch circuits 411–414 in accordance with the output signals 431–434 from the decoder 402. Numerals 441–444 are OR circuits which carry out the logical OR between each output signal of the decoder 402 and each output signal of the latch circuits 411–414. The output of the OR circuit 441 is arranged to correspond to a most significant bit (MSB) of the threshold value 310 (4 bits). Subsequently, the outputs are arranged to correspond to the bit in the order of the OR circuits 441–444, and the output of the OR circuit 444 becomes the least significant bit (LSB) of the threshold value 310. The outputs of the four OR circuits 441–444 are output by the output terminal 451 as a 4-bit threshold datum.

The operation of the threshold generation circuit 301 is described below.

The four latch circuits 411–414 are cleared to "0" by a clear signal (not shown). When the 2-bit signal "00" to designate the most significant bit of the 4-bit signal is input into the input terminal 401, the signal 431 is only output from the decoder 402 at high level. As a result, the binary number "1000" is output from the terminal 451 as a threshold value 310. The threshold value 310 is transmitted to the binarizing circuit 102 in FIG. 7, and the reference pixel data is binarized based on the threshold value 310.

The binarized result is transmitted to the binary interpolation data generation circuit 103, and binary interpolation datum 311 is generated. The interpolation data 311 are input into the terminal 404 of FIG. 8, and transmitted to the latch circuits 411–414. When the latch signal is input from the terminal 405, the binary interpolation data is transmitted only to the latch circuit 411 via the AND circuit 421 and latched, and not transmitted to the other three latch circuits 412–414. Accordingly, the binary interpolation datum 311 binarized at the threshold value "1000" is held by the latch circuit 411 only. In this case it is supposed that high level "1" has been set to the latch circuit 411.

When "01" is input to designate the second bit from the most significant bit of the 4-bit signal to the input terminal 401, the above-described processing is performed, and a new binary interpolation datum 311 is latched by the latch circuit 412. If the interpolation datum 311 is "1", the latch circuit 412 is set with "1", and the threshold value 310 is the binary number "1100". On the other hand, if the interpolation datum 311 is "0", the latch circuit 412 is set with "0", and the threshold value 310 remains as the binary number "1000".

Similarly, the binary interpolation datum 311 is sequentially held by the latch circuits 413 and 414 in accordance with each threshold value 310, and the value which is finally set in the latch circuits 411–414 is the maximum threshold value 310 where the interpolation datum 311 becomes "1". Finally, a disable signal which sets all output signals of the decoder 402 to "0" is input into the input terminal 403. Accordingly, the 4-bit values held in the latch circuits 411–414 (each of the latches 411–414 holds one bit) are output as final interpolation data 310 via the output terminal 451.

In this embodiment, the multivalued interpolation data are obtained via the OR circuits 441–444. However, since the multivalued interpolation data are held in the latch circuits 411–414, the multivalued interpolation data can be obtained by directly outputting the output signals of the latch circuits to the terminal 106. Furthermore, an output terminal to output multivalued interpolation data can be provided separate from the output terminal 451 of the threshold data.

The present invention can be applied to a system constituted by a plurality of devices, or to an apparatus consisting of a single device. Furthermore, it goes without saying that the invention is applicable also to a case where the object of the invention is attained by supplying a program to a system or apparatus.

According to the embodiments, the interpolation processing of the multivalued image can be performed by a practical-size hardware. Furthermore, according to the interpolation circuit, since an edge existed in the reference pixel data is reflected to the interpolation data, the image quality after the interpolation processing is improved.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which obtains interpolated pixel data of multivalued image data based on a plurality of reference pixel data in the vicinity of the interpolated pixel, comprising:

threshold generation means for generating a threshold value;

binarizing means for converting each of the plurality of reference pixel data into binary reference pixel data, in comparison with the threshold value;

binary interpolation means for generating binary interpolation data in the position of the interpolated pixel from a plurality of binary reference pixel data converted by said binarizing means; and multivalued interpolation means for obtaining multivalued interpolation data expressing the interpolating pixel based on the threshold value and the binary interpolation data.

2. The image processing apparatus according to claim 1, wherein said threshold generation means generates thresholds by sequentially using the reference pixel data.

3. The image processing apparatus according to claim 1, wherein said threshold generation means sets a threshold value whose number of bits corresponds to that of the reference pixel data, and sequentially generates threshold value by sequentially setting the bit position to "1" starting from the most significant bit.

4. The image processing apparatus according to claim 1, wherein said binarizing means binarizes the reference pixel data to "1" in a case where the reference pixel data is equal to or greater than the threshold value.

5. The image processing apparatus according to claim 1, wherein said multivalued interpolation means determines a maximum threshold value as multivalued interpolation data where the binary interpolation data is "1".

6. The image processing apparatus according to claim 1, wherein said binarizing means obtains the binary reference pixel data by comparing the threshold value with each of the pixel data of the plurality of reference pixels, and said multivalued interpolation means determines the maximum threshold value as the multivalued interpolation data from each of the binary pixel data and each of the interpolation data, where the interpolation data becomes "1".

7. The image processing apparatus according to claim 1, wherein the plurality of reference pixels are neighboring pixels of the interpolated pixels included in the lines above and below of the interpolated pixel.

8. The image processing apparatus according to claim 1, wherein said binary interpolation means determines binary interpolation data when the pixels above and below the interpolated pixel are the same, while when different, a plurality of binary reference pixel data are used to obtain binary interpolation data.

9. The image processing apparatus according to claim 1, wherein said multivalued interpolation means determines the maximum value of the threshold value as multivalued interpolation data, where the binary interpolation data is "1".

10. An image processing method which obtains interpolated pixel data of multivalued image data based on a plurality of reference pixel data in the vicinity of the interpolated pixel, comprising:

a step for generating a threshold value;

a step for converting each of the plurality of the reference pixel data to binary reference pixel data by comparing with the threshold value;

a step for generating binary interpolation data in the position of the interpolated pixel from a plurality of binary reference pixel data; and a multivalued interpolation step for obtaining multivalued interpolation data expressing the interpolating pixel based on the threshold value and the binary interpolation data.

11. The image processing method according to claim 10, wherein the generation of thresholds is performed by sequentially using the reference pixel data.

12. The image processing method according to claim 10, wherein the threshold value is a value whose number of bits corresponds to that of the reference pixel data, and sequentially generates threshold value by sequentially setting the bit position to "1" starting from the most significant bit of the threshold value.

13. The image processing method according to claim 10, wherein said binarizing step binarizes the reference pixel data to "1" in a case where the reference pixel data is equal to or greater than the threshold value.

14. The image processing method according to claim 10, wherein the multivalued interpolation data is determined by a maximum threshold where the binary interpolation data is "1".

15. An image processing method which obtains interpolated pixel data of multivalued image data based on a plurality of reference pixel data in the vicinity of the interpolation data, comprising:

a step of generating a threshold value having a predetermined number of bits where the maximum significant bit is "1";

a first step of converting each of the plurality of reference pixel data to binary reference pixel data by comparing with the threshold value;

a second step of generating binary interpolation data in the position of the interpolated pixel from a plurality of binary reference pixel data;

a third step of storing the binary interpolation data corresponding to the bit position of "1" of threshold value;

a fourth step of shifting toward the least significant bit, the bit position of "1" of the threshold value; and an output step of repeating said first step through fourth step until the least significant bit of the threshold becomes "1" and outputting the value stored in said third step as multivalued interpolation data.

* * * * *

UNITED STATES PATENT AND TRADEMARK OFFICE
CERTIFICATE OF CORRECTION

PATENT NO. : 5,568,597

DATED : October 22, 1996

INVENTORS : TADAYOSHI NAKAYAMA ET AL.

It is certified that error appears in the above-identified patent and that said Letters Patent is hereby corrected as shown below:

<u>ON TITLE PAGE</u>
   Line 2
   In [57] ABSTRACT   "below" should read --lower--.

<u>COLUMN 1</u>

Line 30,    "of" should read --a--;
   Line 49,    "$X_4$" should read --$X_4$,--;
   Line 50,    "corresponding," should read --corresponding--;
   Line 57,    ".As" should read --. As--.

<u>COLUMN 3</u>

Line 39,    "interpolatioh" should read --interpolation--.

Signed and Sealed this

Third Day of June, 1997

BRUCE LEHMAN

*Attest:*

*Attesting Officer*     *Commissioner of Patents and Trademarks*